United States Patent
Yuan (10) Patent No.: US 9,330,130 B1
(45) Date of Patent: May 3, 2016

(54) GET ROW INDEX OF RECORD IN DYNAMIC DATA TABLE

(71) Applicant: CA, Inc., Islandia, NY (US)

(72) Inventor: Sheue S. Yuan, Moorestown, NJ (US)

(73) Assignee: CA, Inc., Islandia, NY (US)

( * ) Notice: Subject to any disclaimer, the term of this patent is extended or adjusted under 35 U.S.C. 154(b) by 351 days.

(21) Appl. No.: 13/781,409

(22) Filed: Feb. 28, 2013

(51) Int. Cl.
*G06F 17/30* (2006.01)

(52) U.S. Cl.
CPC ................ *G06F 17/30345* (2013.01)

(58) Field of Classification Search
CPC ..................................... G06F 17/30
See application file for complete search history.

(56) References Cited

U.S. PATENT DOCUMENTS

| | | | |
|---|---|---|---|
| 2007/0050379 A1* | 3/2007 | Day et al. | 707/100 |
| 2008/0147596 A1* | 6/2008 | McKenna et al. | 707/2 |
| 2008/0301089 A1* | 12/2008 | Makeev | 707/3 |
| 2009/0287746 A1* | 11/2009 | Brown | 707/203 |
| 2013/0297613 A1* | 11/2013 | Yu | 707/741 |

* cited by examiner

*Primary Examiner* — Apu Mofiz
*Assistant Examiner* — Farhad Agharahimi
(74) *Attorney, Agent, or Firm* — Gilliam IP PLLC (57) ABSTRACT

A method includes receiving a request to lookup a record in a database having dynamic record updates, performing a binary search with a basket set of sorted values as a middle key range set of records, determining if an input key value is within the middle key range set of records, and if the input key value is not within the middle key range set of records, shifting the middle key range set of records such that it includes a record corresponding to the input key value.

20 Claims, 4 Drawing Sheets

GET ROW INDEX OF RECORD IN DYNAMIC DATA TABLE

BACKGROUND

When using a limited-size user interface (UI) table to display records stored in a large database table, a page navigation is used to retrieve a set of database records in the table size for table display. The records displayed in the table are usually in a sorted order. When a record lookup in the table is performed, the row index of the record in the sorted data table needs to be obtained for the UI table page navigation and record highlight.

The records in the underlying database table are not stored in any sorting order. There is no row index column in the sorted record table returned by using an SQL by order command. Further, retrieving the row index of a database record in a sorting order while at the same time deleting or inserting rows in the data table may change the indexes of rows.

There are some GetRowIndex methods introduced in some software products. Such a GetRowIndex method either uses a static size data table, or loads the entire data table into memory as a table collection before calling the method for the index lookup. The method has a notice for deleting or inserting rows in the table that may change the indices of rows and does not assume that indices received before such an operation will index the same rows after. The method does not have the capability of handling the index lookup within a dynamic database table.

BRIEF SUMMARY

A method includes receiving a request to lookup a record in a database having dynamic record updates, performing a binary search function with a basket set of sorted values as a middle key range set of records, determining if an input key value is within the middle key range set of records, and if the input key value is not within the middle key range set of records, shifting the middle key range set of records such that it includes a record corresponding to the input key value.

In one embodiment, a system includes a computer system is programmed to provide authentication services to a group of users. A database is coupled to the computer system, the database programmed to receive a request to lookup a record in a database having dynamic record updates, perform a binary search function with a basket set of sorted values as a middle key range set of records, determine if an input key value is within the middle key range set of records, and if the input key value is not within the middle key range set of records, shift the middle key range set of records such that it includes a record corresponding to the input key value.

In a further embodiment, a computer program product includes code to cause a programmed computer to perform a method. The method includes receiving a request to lookup a record in a database having dynamic record updates, performing a binary search function with a basket set of sorted values as a middle key range set of records, determining if an input key value is within the middle key range set of records, and if the input key value is not within the middle key range set of records, shifting the middle key range set of records such that it includes a record corresponding to the input key value.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In various embodiments, a binary search function with a basket set of values is used to look up a record in a large database with dynamic record updates. A middle element of the array for the comparison is NOT a single key value, but a basket set of sorted values as a middle key range set in various embodiments.

The comparison action may be performed as a range search in that the input key value will compare with two end elements of the middle range set to decide if the value is within the range. Depending on the type of sorting order, ascending or descending, the compare result determines the direction of the next middle range set being retrieved from the dynamic data table for the next step of search action.

The basket/range size will be the threshold size of the dynamic record updates during a lookup process. The size should be twice of the number of records adding or removing from the database table while a period of lookup time.

SQL SELECT command can be first used to lookup the record with the key value within the database table to eliminate the chance of the not-found case.

With a half-interval/binary basket search, the row index of a record with a unique key value within a large database table can be obtained in a very efficient way without loading the entire database table into the memory and turning into a huge static table collection for the index lookup.

Figure 1:
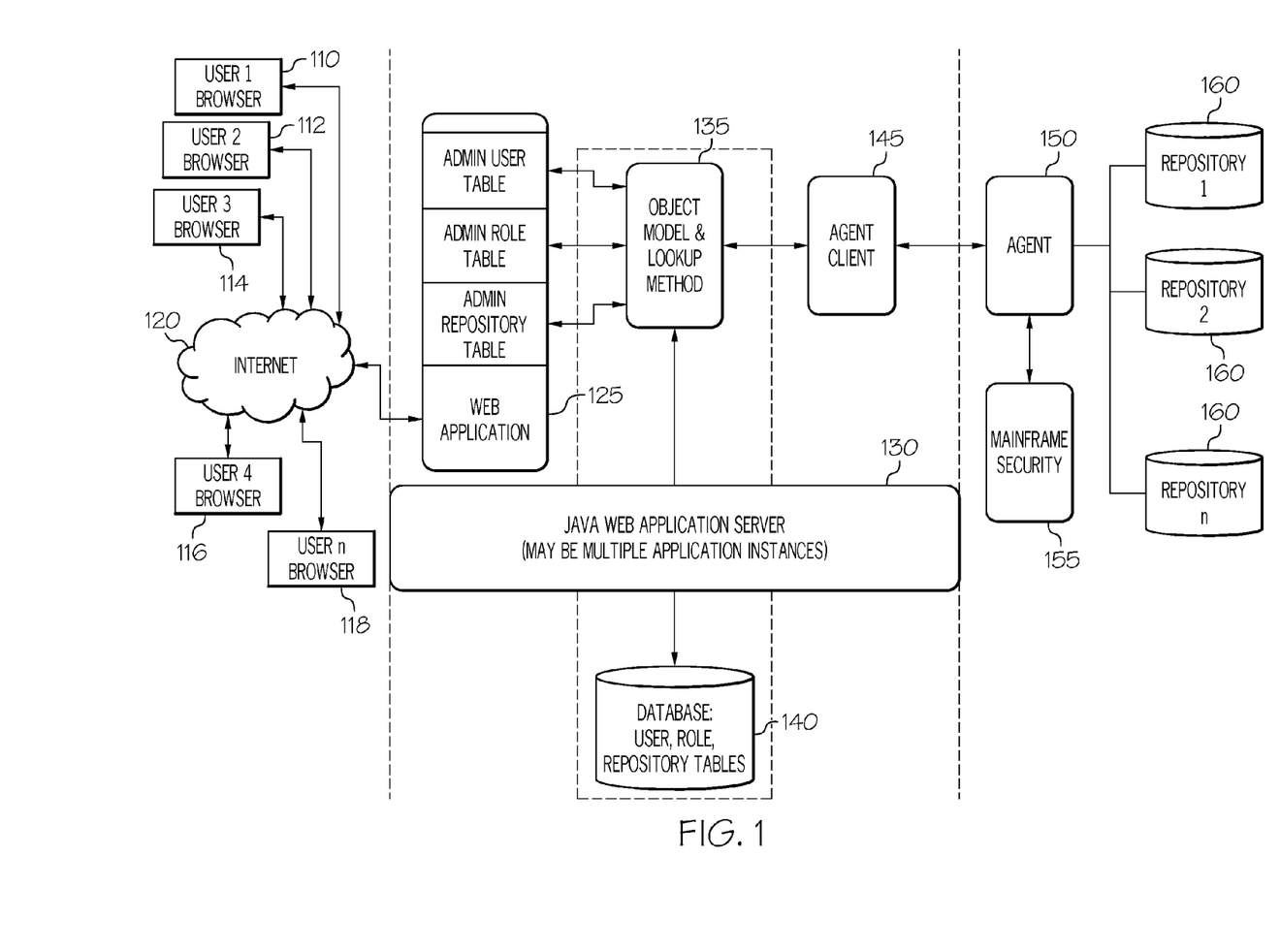
FIG. 1 is a block diagram of a system to provide access to data in a dynamically changing database according to an example embodiment.

FIG. 1 is a simplified block diagram of a system 100. System 100 includes many users 110, 112, 114, 116, 118 using a web browser on one or more different types of devices coupled to a network 120, such as the Internet. The browsers provide a user interface to a database application 125 via the network 120. The application 125 may be running on an application server 130 such as a Java web application server. The application 125 includes code to implement an object model and lookup method 135 that is coupled to a database 140. The method 135 utilizes database commands to lookup a user record from database 140 to be displayed via a request from user browser. Since the user browsers have a limited area in which to display the list of users and highlight a lookup user record, and the number of users in the database are dynamically changing, a new method of obtaining a specific user to display is utilized as described in further detail below.

Application 125 may include an administrative user table 142, and administrative role table 144 to define roles for each user, and an administrative repository table 146. The application 125 initiates authentication of user to allow the user to access the database 140. The user browsers indicated at 110, 112, 114, 116, 118 may include both end users and administrative users. An agent client 145 communicates with a mainframe agent 150. The mainframe agent 150 utilizes mainframe security services 155, and checks and authenticates users for accessing reports in one or more repositories 160.

The application 125 in one embodiment provides authentication services, such as a user ID and a password that must be entered in order to access the database and applications, such as credit card management applications in one example. The database 140 may contain large tables of data corresponding to one or more applications, that may also be referred to as a web product. In one example table, a list of the users is provided. The list may be dynamic, with new users being added to the list while the application or applications are running. In order to access data, the user needs to be registered, and access to the backend mainframe report data in repositories 160 may be based on roles of each user. The application or web product may not be aware of which users have been added by other application instances, making control of repository access based on roles different.

Figure 2:
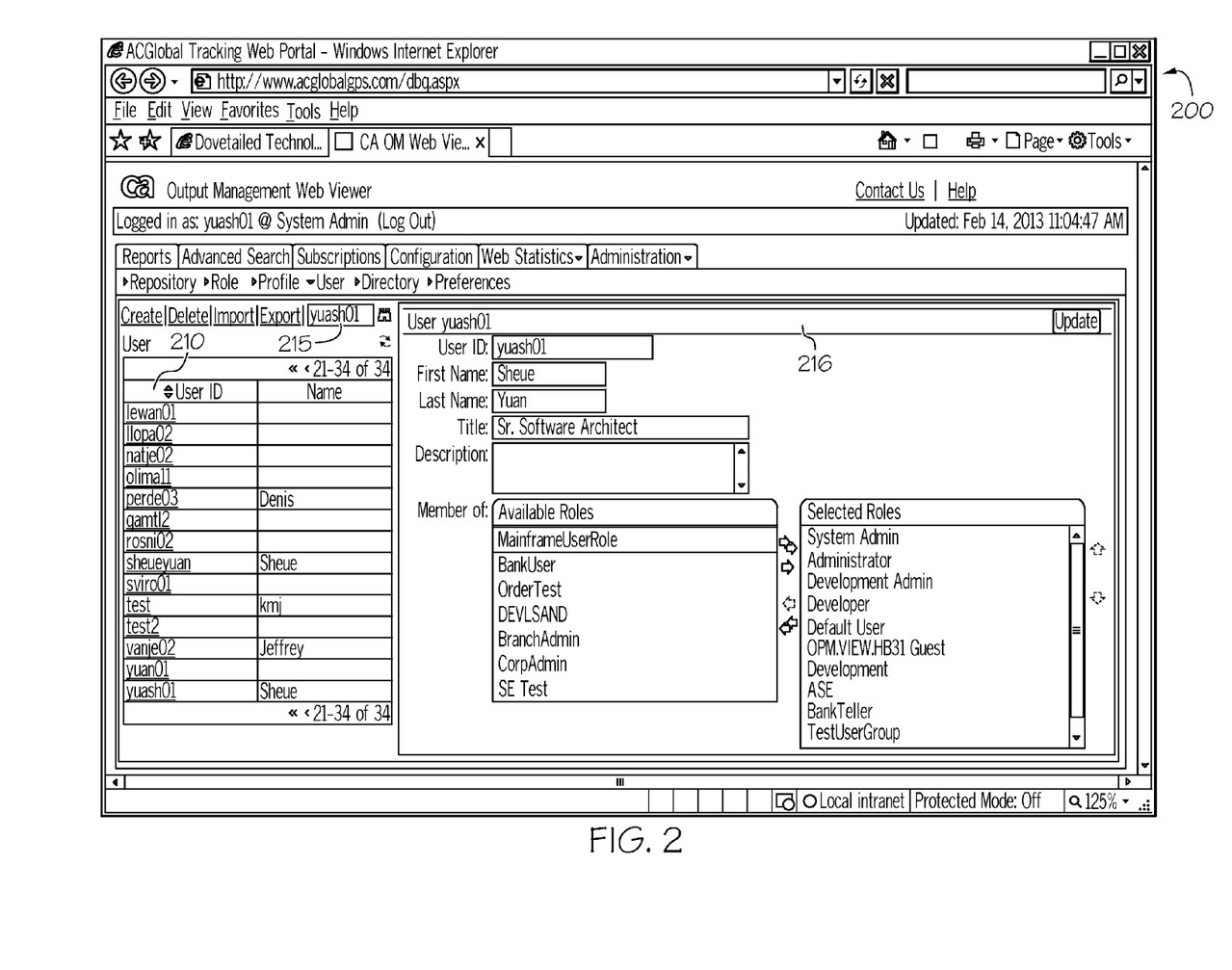
FIG. 2 is a screen shot representation illustrating a web view according to an example embodiment.

In one example, a display provided by a user browser is illustrated at 200 in FIG. 2. The display 200 in one embodiment displays a list of users 210 in a user interface (UI) table in response to a query 215. The list of users 210 in the UI table is limited in size. In one embodiment, the UI list may be limited to showing 20 users. In other embodiments, the list may be limited to more or fewer users depending on the size of the web application user table set by the administrator, user interface design factors, or other factors. The limit may be referred to as a page size in some embodiments. A record 216 containing data corresponding to a user that has been selected from the list 210 generally corresponds to a record in the database corresponding to the selected user. Since users are being dynamically added to the database, it can be difficult to precisely locate the row index of the user record in the database responsive to the query. A method has been devised to quickly search and generate a suitable list for display that likely contains the desired user. In one embodiment, the backend mainframe security component 155 has a limit of the number of users for authentication checks and these user can be added to the database 140 if not existing or removed from the database 140 during a selected time period.

Figure 3:
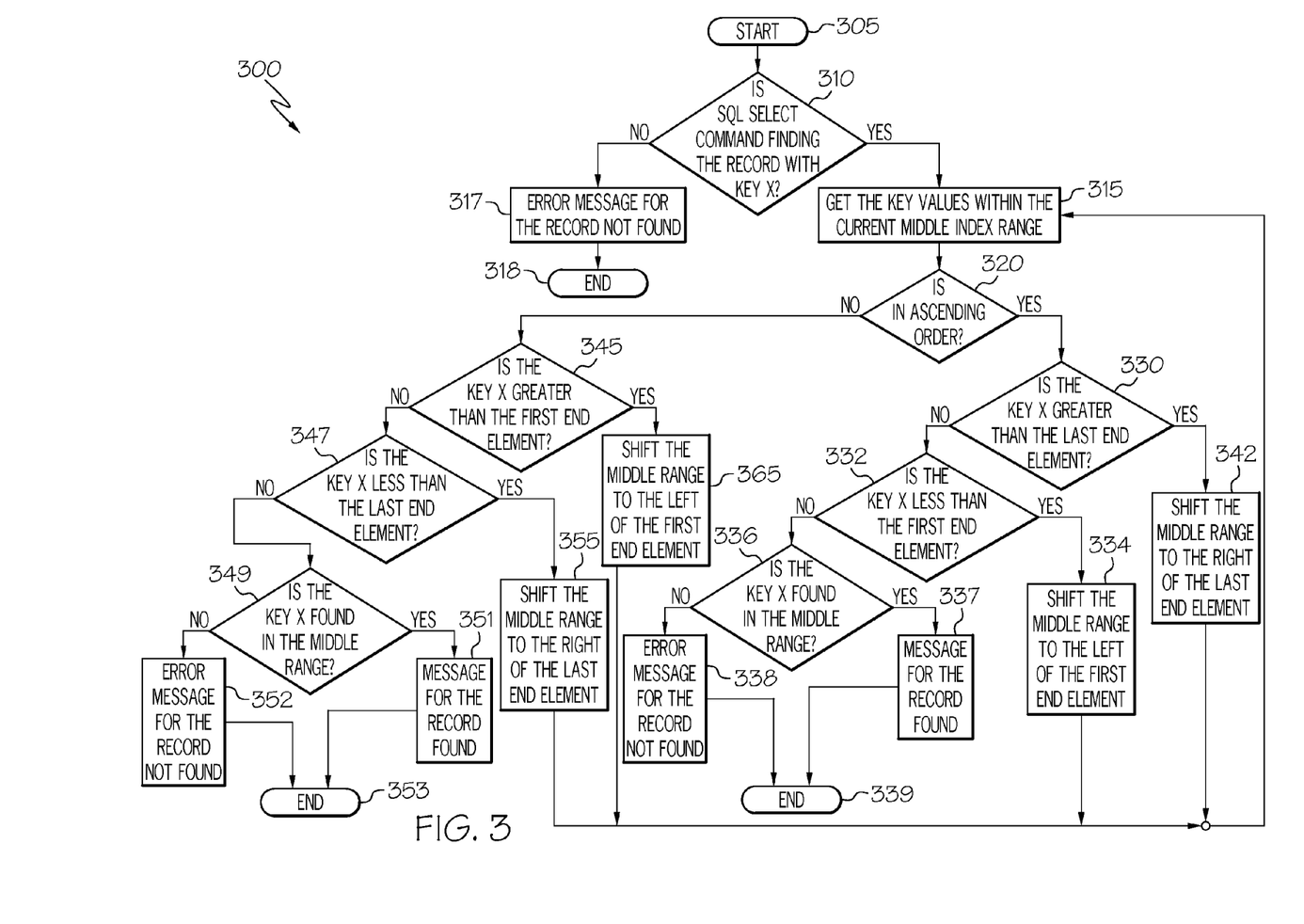
FIG. 3 is a flow chart representation of getting the row index of a record from a dynamically changing database according to an example embodiment.

FIG. 3 is a flowchart diagram of a method 300 for obtaining a suitable range of rows for display in a limited field display. Method 300 is described with reference to a simple example. In the example, a large group of users is tracked in a database table. The users may be added to the table when initially logging into the web application via a mainframe component (agent 150, security 155) that provides for user authentication. The mainframe component has a limit of the number of new users handled in a very short period of time.

In the example, a user record with USER ID, 'doejo01', is found in the data table with 500 user records. The description also includes a description of paths that may not be encountered with the specific example to provide a robust description of the method. To efficiently navigate to a user interface (UI) table (sorted by USER ID in ascending order) having page with a page size of 20 rows, the row index (the position in the sorted table) of the record is needed. If the row index of the record is 123, then the page number can be calculated by 123/20+1. The record can be shown on page 7 row 3 in the UI table sorted by USER ID.

Method 300 begins at 305, and at 310, the method checks to determine if the SQL select command is finding the user record in the database table with a size about 500 records. The USER ID is used as a unique key, X, in the database table.

If the record is being found, at 315, the middle index of the data table (index 1 to 500) is calculated by (1+500)/2 as 250. A set of records with key values indexed from 240 to 260 (the middle index range) are retrieved as a middle key range set. If the record was not being found at 310, an error message may be generated at 317, and method 300 ends at 318.

Following retrieval of the middle index range, the middle index range is checked at 320 to determine which table sorting order is being used. If the range is in ascending order (in this sample case), the method moves to 330, where it is determined if the key X is greater than the last end element of the middle range set, that is the record at index 260 with key 'melke02'. In the example, the input key is not greater than the last end element and the method moves to 332, where the input key is compared with the first end element of the middle range set, that is the record at index 240 with key 'lenan03'. In the example, the input key is less than the first end element, and at 334, the middle range is shifted to the left of the first end element to be 1 to 249. The size of the middle range set may be determined as a function of the number of users that the mainframe component has a limit as n, $s=f(n)=2 \times n+1$. In this sample case, n is 10 and s is 21.

If the input key is not less than the first end element as determined at 332, a check is made at 336 to determine if the key X is found in the middle range. If yes, a message is generated at 337 to indicate that the record is found. If not, an error message is provided at 338. The process ends in either event at 339.

If at 330, the key X is greater than the last end element, the middle range is shifted to the right of the last end element at 342 and the method returns to 315.

In the example, the middle index range is in ascending order, and at 315 the middle index is recalculated by (1+249)/2=125. A set of records with key values indexed from 115 to 135 (as middle index range) are retrieved as middle key range set.

At 330, the input user key is compared with the last end element of the middle range set, that is the record at index 135 with key 'gaode02'. In the example, the input key is not greater than the last end element, and at 332 the input key X is compared with the first end element of the middle range set, that is the record at index 115 with key 'dande06'. In the example, the input key is not less than the first end element, and at 336, a search for the input user key within the middle range set is performed. If a match with the record at index 123 is found a message for the record being found is generated at 337. The calculation 123/20+1 is used to convert the row index 123 to page 7 and row number 7 in the UI table sorted in ascending order. If not found, an error message 338 is generated. The method ends at 339.

In the case of in descending order, if at 345, if the key X is greater than the first end element, the middle range is shifted to the left of the first end element at 365 and the method returns to 315. If not, a determination is made at 347, if the key X is less than the last end element. If yes, the middle range is shifted to the right of the last end element at 355 and the method returns to 315.

At 345, the input user key is again compared with the first end element of the middle range set, that is the record at index 240 with key 'melke02'. In the example, the input key is not greater than the first end element, so at 347, the input key is compared with the last end element of the middle range set, that is the record at index 260 with key 'lenan03'. In the example, the input key is less than the last end element, and at 355, the middle range is shifted to the right of the last end element to be 251 to 500 and processing continues at 315 where the middle index is recalculated by (251+500)/2=375. A set of records with key values indexed from 365 to 385 (as middle index range with the size of 21) are retrieved as middle key range set.

At 320, the table sorting order is determined. In the example, the table is sorted in descending order, and the method goes to go to 345, where the input user key is compared with the first end element of the middle range set, that is the record at index 365 with key 'gaode02'. In the example, the input key is not greater than the first end element, and at 347, the input key is compared with the last end element of the middle range set, that is the record at index 385 with key 'dande06'. In the example, the input key is not less than the last end element, and at 349, the input user key is searched for within the middle range set and match with the record at index 378. The calculation 378/20+1 is used to convert the row index 378 to the page 19 and row number 18 in the UI table sorted in descending order. If the key is not found in the middle range at 349, an error message is generated at 352. If the key was found in the middle range, a message indicating the record was found is generated at 351.

Figure 4:
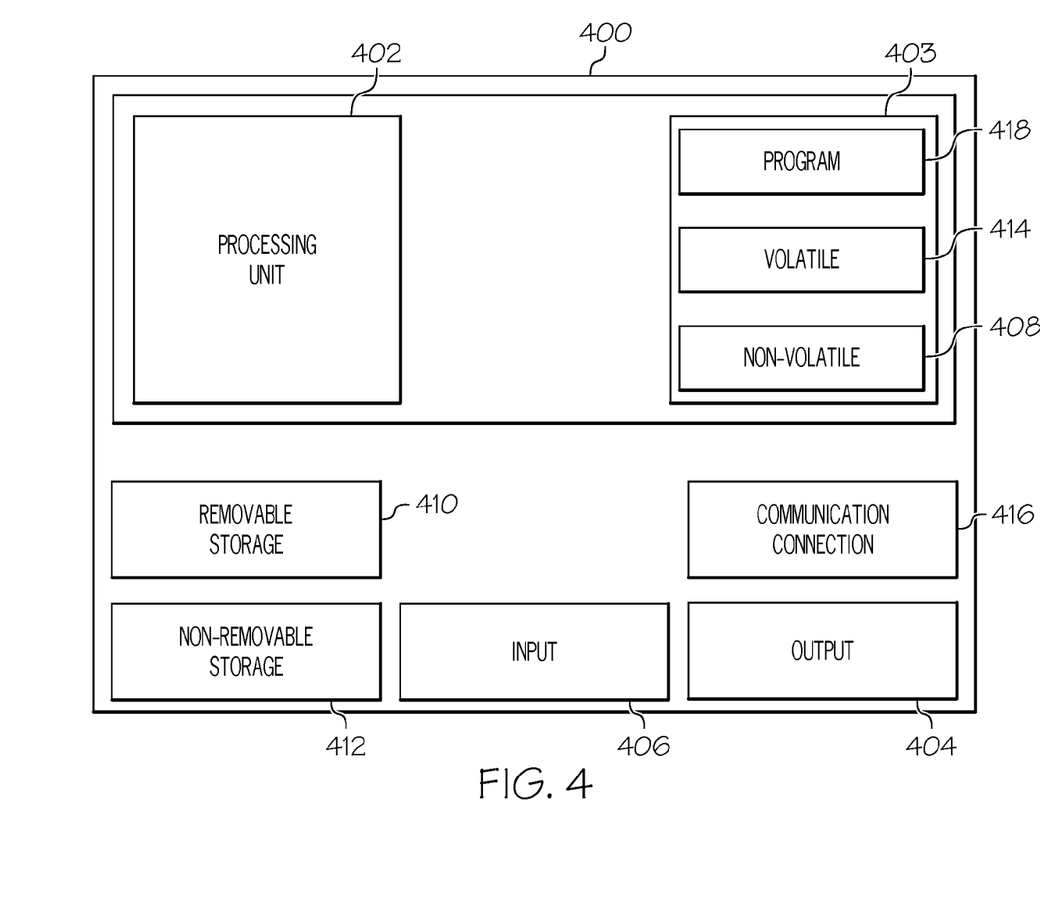
FIG. 4 is a block diagram of an example computer system for performing one or more of the methods and algorithms according to an example embodiment.

FIG. 4 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 410, may include a processing unit 402, memory 403, removable storage 410, and non-removable storage 4412. Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 400 may include or have access to a computing environment that includes input 406, output 404, and a communication connection 416. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 400. A hard drive, CD-ROM, and RAM are some examples of articles including a non-transitory computer-readable medium. For example, a computer program 418 capable of providing a generic technique to perform access control check for data access and/or for doing an operation on one of the servers in a Java web application or component object model (COM) based system may be included on a CD-ROM and loaded from the CD-ROM to a hard drive. The computer-readable instructions allow computer 400 to provide generic access controls in a computer system having multiple users and servers.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   receiving a request to lookup a key in a database;
   determining a first index value and a first range of index values, wherein the first range of index values comprises at least the first index value, wherein a count of the first range of index values is based, at least in part, on a number of records that are capable of being added or removed from the database during a period of lookup time;
   retrieving, from the database, a first set of sorted records corresponding to the first range of index values, wherein the first set of sorted records comprises at least a first record corresponding to a first of the first range of index values and a second record corresponding to a last of the first range of index values;
   comparing the key to at least one of a first value of the first record or a second value of the second record;
   determining whether the key is within the first set of sorted records based, at least in part, on said comparing the key to at least one of the first value or the second value;
   in response to determining that the key is within the first set of sorted records, determining a second index value corresponding to a third record of the first set of sorted records, wherein the third record of the first set of sorted records comprises a value that matches the key; and
   in response to determining that the key is not located within the first set of sorted records,
   determining a third index value and a second range of index values comprising at least the third index value based, at least in part, on said comparing the key to at least one of the first value or the second value; and
   retrieving, from the database, a second set of sorted records corresponding to the second range of index values.

2. The method of claim 1, wherein the count of the first range of index values is based, at least in part, on twice the number of records that are added or removed from the database during the period of lookup time.

3. The method of claim 2, wherein the period of lookup time corresponds to a time taken to lookup a key in the database.

4. The method of claim 1 further comprising:
   after receiving the request to lookup the key in the database, determining whether the key matches a value of a record in the database; and
   in response to determining that the key does not match a value of a record in the database, returning an error.

5. The method of claim 1, further comprising:
   in response to determining that the key is equal to the first value of the first record, determining a first page that comprises the first record based, at least in part, on the first of the first range of index values and a maximum number of records displayed on each page;

in response to determining that the key is equal to the second value of the second record, determining a second page that comprises the second record based, at least in part, on the last of the first range of index values and the maximum number of records displayed on each page; and in response to determining that the key is within the first set of sorted records, determining a third page that comprises the third record based, at least in part, on the second index value and the maximum number of records displayed on each page.

6. The method of claim 1, wherein the first index value is a middle index value of a plurality of index values.

7. The method of claim 1, wherein determining a third index value and a second range of index values comprises:

in response to determining that the key is greater than the second value of the second record, selecting the third index value from a set of index values that are greater than the first index value; and selecting the second range of index values from the set of index values that are greater than the first index value, wherein the second range of index values comprises the third index value; or in response to determining that the key is less than the first value of the first record, selecting the third index value from a set of index values that are less than the first index value; and selecting the second range of index values from the set of index values that are less than the first index value, wherein the second range of index values comprises the third index value.

8. The method of claim 1, wherein determining the third index value and the second range of index values comprises:

in response to determining that the key is less than the second value of the second record, selecting the third index value from a set of index values that are less than the first index value; and selecting the second range of index values from the set of index values that are less than the first index value, wherein the second range of index values comprises the third index value; or in response to determining that the key is greater than the first value of the first record, selecting the third index value from a set of index values that are greater than the first index value; and selecting the second range of index values from the set of index values that are greater than the first index value, wherein the second range of index values comprises the third index value.

9. A system comprising:

a processor;

a machine readable medium having program code executable by the processor to cause the system to, receive a request to lookup a key in a database;

determine a first index value and a first range of index values, wherein the first range of index values comprises at least the first index value, wherein a count of the first range of index values is based, at least in part, on a number of records that are capable of being added or removed from the database during a period of lookup time;

retrieve, from the database, a first set of sorted records corresponding to the first range of index values, wherein the first set of sorted records comprises a first record corresponding to a first of the first range of index values and a second record corresponding to a last of the first range of index values;

compare the key to at least one of a first value of the first record or a second value of the second record;

determine whether the key is within the first set of sorted records based, at least in part, on said comparison of the key to at least one of the first value or the second value;

in response to a determination that the key is within the first set of sorted records, determine a second index value corresponding to a third record of the first set of sorted records, wherein the third record of the first set of sorted records comprises a value that matches the key; and in response to a determination that the key is not located within the first set of sorted records, determine a third index value and a second range of index values comprising at least the third index value based, at least in part, on said comparison of the key to at least one of the first value or the second value; and retrieve, from the database, a second set of sorted records corresponding to the second range of index values.

10. The system of claim 9, wherein the count of the first range of index values is based, at least in part, on twice the number of records that are added or removed from the database during the period of lookup time.

11. The system of claim 10, wherein the period of lookup time corresponds to a time taken to lookup a key in the database.

12. The system of claim 9 further comprising program code executable by the processor to cause the system to:

after receiving the request to lookup the key in the database, determining whether the key matches a value of a record in the database; and in response to determining that the key does not match a value of a record in the database, returning an error.

13. The system of claim 9 further comprising program code executable by the processor to cause the system to:

in response to a determination that the key is equal to the first value of the first record, determine a first page that comprises the first record based, at least in part, on the first of the first range of index values and a maximum number of records displayed on each page;

in response to determination that the key is equal to the second value of the second record, determine a second page that comprises the second record based, at least in part, on the last of the first range of index values and the maximum number of records displayed on each page; and in response to a determination that the key is within the first set of sorted records, determine a third page that comprises the third record based, at least in part, on the second index value and the maximum number of records displayed on each page.

14. The system of claim 9, wherein the first index value is a middle index value of a plurality of index values.

15. The system of claim 9, wherein the program code executable by the processor to cause the file system to determine the third index value and the second range of index values comprises program code executable by the processor to cause the system to:

in response a determination that the key is greater than the second value of the second record, select the third index value from a set of index values that are greater than the first index value; and select the second range of index values from the set of index values that are greater than the first index value, wherein the second range of index values comprises the third index value; or in response a determination that the key is less than the first value of the first record, select the third index value from a set of index values that are less than the first index value; and select the second range of index values from the set of index values that are less than the first index value, wherein the second range of index values comprises the third index value.

16. The system of claim 9, wherein the program code executable by the processor to cause the system a determination the third index value and the second range of index values comprising the third index value comprises program code executable by the processor to cause the system to:

in response a determination that the key is less than the second value of the second record, select the third index value from a set of index values that are less than the first index value; and select the second range of index values from the set of index values that are less than the first index value, wherein the second range of index values comprises the third index value; or in response to determining that the key is greater than the first value of the first record, select the third index value from a set of index values that are greater than the first index value; and select the second range of index values from the set of index values that are greater than the first index value, wherein the second range of index values comprises the third index value.

17. One or more non-transitory machine readable media having program code stored therein, the program code comprising instructions to:

receive a request to lookup a key in a database;

determine a first index value and a first range of index values, wherein the first range of index values comprises at least the first index value, wherein a count of the first range of index values is based, at least in part, on a number of records that are capable of being added or removed from the database during a period of lookup time;

retrieve, from the database, a first set of sorted records corresponding to the first range of index values, wherein the first set of sorted records comprises a first record corresponding to a first of the first range of index values and a second record corresponding to a last of the first range of index values;

compare the key to at least one of a first value of the first record or a second value of the second record;

determine whether the key is within the first set of sorted records based, at least in part, on said comparison of the key to at least one of the first value or the second value;

in response to a determination that the key is within the first set of sorted records, determine a second index value corresponding to a third record of the first set of sorted records, wherein the third record of the first set of sorted records comprises a value that matches the key; and in response to a determination that the key is not located within the first set of sorted records, determine a third index value and a second range of index values comprising at least the third index value based, at least in part, on said comparison of the key to at least one of the first value or the second value; and retrieve, from the database, a second set of sorted records corresponding to the second range of index values.

18. The machine readable media of claim 17, wherein the count of the first range of index values is based, at least in part, on twice the number of records that are added or removed from the database during the period of lookup time.

19. The machine readable media of claim 18, wherein the period of lookup time corresponds to a time taken to lookup a key in the database.

20. The machine readable media of claim 17, wherein the instructions to determine the third index value and the second range of index values comprises instructions to:

in response a determination that the key is greater than the second value of the second record, select the third index value from a set of index values that are greater than the first index value; and select the second range of index values from the set of index values that are greater than the first index value, wherein the second range of index values comprises the third index value; or in response a determination that the key is less than the first value of the first record, select the third index value from a set of index values that are less than the first index value; and select the second range of index values from the set of index values that are less than the first index value, wherein the second range of index values comprises the third index value.

* * * * *